(12) United States Patent
Kurz et al.

(10) Patent No.: US 8,363,737 B2
(45) Date of Patent: Jan. 29, 2013

(54) WIRELESS DATA TRANSMISSION BETWEEN A BASE STATION AND A TRANSPONDER VIA INDUCTIVE COUPLING

(75) Inventors: Alexander Kurz, Schwaebisch Hall (DE); Mathew Neal, Pfaffing (DE)

(73) Assignee: Atmel Corporation, San Jose, CA (US)

( * ) Notice: Subject to any disclaimer, the term of this patent is extended or adjusted under 35 U.S.C. 154(b) by 3 days.

(21) Appl. No.: 13/118,184

(22) Filed: May 27, 2011

(65) Prior Publication Data

US 2011/0243258 A1 Oct. 6, 2011

Related U.S. Application Data

(63) Continuation of application No. 11/705,012, filed on Feb. 12, 2007, now Pat. No. 7,953,146.

(30) Foreign Application Priority Data

Feb. 10, 2006 (DE) .................. 10 2006 007 262

(51) Int. Cl.
*H04L 27/00* (2006.01)
(52) U.S. Cl. ......... 375/259; 375/219; 375/244; 375/239
(58) Field of Classification Search .................. 375/259, 375/219, 224, 239; 370/10.2, 825, 10.34; 702/57, 64, 106; 455/41.1, 69, 39
See application file for complete search history.

(56) References Cited

U.S. PATENT DOCUMENTS

| | | | |
|---|---|---|---|
| 4,975,654 A | 12/1990 | Becker et al. | |
| 5,105,190 A | 4/1992 | Kip et al. | |
| 5,491,471 A | 2/1996 | Stobbe | |
| 5,543,798 A | 8/1996 | Schuermann | |
| 6,044,333 A | 3/2000 | Stobbe et al. | |
| 6,127,929 A | 10/2000 | Roz | |
| 6,147,591 A | 11/2000 | Stobbe et al. | |
| 6,882,826 B2 | 4/2005 | Hedinger et al. | |
| 7,016,311 B2 | 3/2006 | Tiernay et al. | |
| 7,376,391 B2 | 5/2008 | Friedrich et al. | |
| 2004/0213169 A1 | 10/2004 | Allard et al. | |
| 2005/0053024 A1 | 3/2005 | Friedrich | |
| 2005/0056704 A1 | 3/2005 | Kim | |
| 2005/0225447 A1 | 10/2005 | Diorio et al. | |
| 2005/0237162 A1 | 10/2005 | Hyde et al. | |

FOREIGN PATENT DOCUMENTS

| | | |
|---|---|---|
| DE | 197 44 781 A1 | 4/1999 |
| DE | 198 27 476 C1 | 9/1999 |
| DE | 101 38 218 A1 | 2/2003 |

OTHER PUBLICATIONS

Klaus Finkenzeller, "RFID Handbook," Fundamentals and Applications in Contactless Smart Cards and Identification, Second Edition, Chapter 3.2.1.2 (*Load Modulation*), pp. 42-47, 1999.

*Primary Examiner* — Shuwang Liu
*Assistant Examiner* — Helene Tayong
(74) *Attorney, Agent, or Firm* — Baker Botts L.L.P.

(57) ABSTRACT

In one embodiment, a method includes receiving a carrier signal transmitted by a base station according to either a first data-transmission protocol or a second data-transmission protocol; detecting a first field gap in the carrier signal indicating initiation of a data transmission by the base station; and determining whether a reference duration is present in the carrier signal after the first field gap. The method includes, if the reference duration is present in the carrier signal after the first field gap then, according to the first data-transmission protocol, determining a calibration value for the data transmission based on the reference duration and decoding the data transmission by measuring durations between successive subsequent field gaps and determining whether each duration as measured is a binary 1 or binary 0 based on the calibration value.

17 Claims, 3 Drawing Sheets

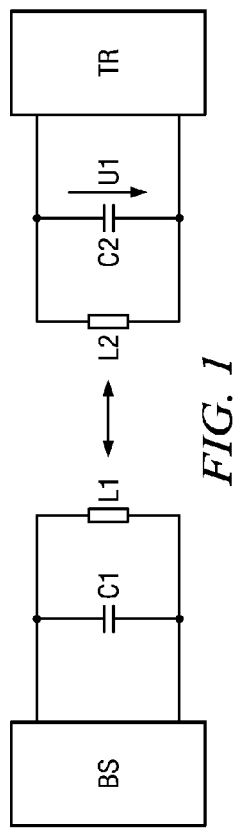
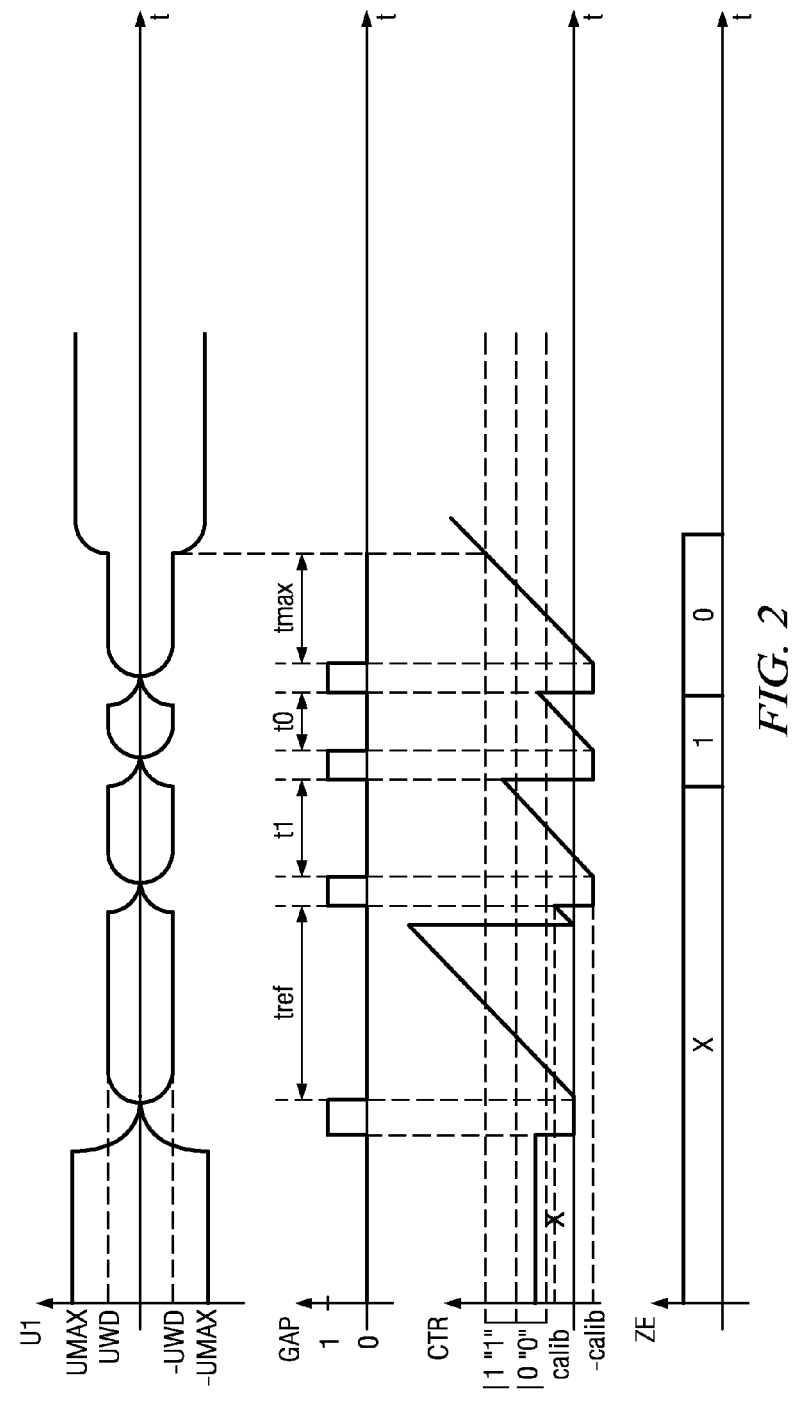

WIRELESS DATA TRANSMISSION BETWEEN A BASE STATION AND A TRANSPONDER VIA INDUCTIVE COUPLING

RELATED APPLICATION

This application is a continuation under 35 U.S.C. §120 of U.S. patent application Ser. No. 11/705,012, filed 12 Feb. 2007, which claims the benefit under 35 U.S.C. §119(a) of German Patent Application No. DE 102006007262.6, filed 10 Feb. 2006.

TECHNICAL FIELD

This disclosure generally relates to wireless data transmission between a base station and a transponder.

BACKGROUND

Contactless identification systems or so-called radio-frequency-identification (RFID) systems typically include a base station or a reading device or a reading unit and a plurality of transponders or remote sensors. The transponders or their transmitting and receiving devices typically do not have an active transmitter for data transmission to the base station. Such inactive systems are called passive systems when they do not have their own power supply, and semipassive systems when they have their own power supply. Passive transponders draw the power necessary for their supply from the electromagnetic field emitted by the base station.

For data transmission between the transponder and the base station, for a programming operation of the transponder, for example, the transponder has an interface of a specific interface type, which is compatible with the corresponding interface type of the base station. The interface types can be divided, in a preliminary rough grouping, into contact and contactless types.

The interface types with which the data transmission occurs contactless or contact-free differ, inter alia, in the operating or carrier frequency used for the data transmission, i.e., the frequency transmitted by the base station. Frequently used frequencies are, for instance, 125 kHz (LF range), 13.56 MHz (RF range), a frequency range between 860 MHz to 960 MHz (UHF range), and a frequency range greater than 3 GHz (microwave range).

Another differentiating feature of the different interface types is the type of coupling between the specific interfaces of the transponder and the base station. In this case, inter alia, the so-called inductive or magnetic coupling and the so-called far-field coupling are differentiated. Described in simplified terms, in inductive or near-field coupling, an antenna coil of the base station and an antenna coil connected to the input circuit of the transponder form a transformer, which is why this type of coupling is also called a transformer coupling. In inductive coupling, a maximum distance between the transponder and the base station is limited to the near field of the employed antenna. The near-field range is substantially established by the operating frequency of the interface.

The so-called load modulation is usually used in inductive coupling for data transmission from a transponder to a base station; in this regard, see, for example, Finkenzeller, Chapter 3.2.1.2.1 "Load Modulation."

For data transmission from the base station to the transponder, in inductive coupling, the base station usually transmits a carrier signal with a frequency in a frequency range of 50 kHz to 250 kHz. To begin the data transmission, the base station via amplitude modulation of the carrier signal first generates a short field gap or a so-called "gap"; i.e., the amplitude of the carrier signal is damped or attenuated briefly, for example, for about 50 µs to 400 µs, or totally suppressed.

Characters which are transmitted subsequent to the initiation of the data transmission by the base station are encoded by the associated durations between temporally successive field gaps. A first character value is hereby assigned a first duration and at least one second character value is assigned a second duration. To decode the transmitted characters, the transponder determines the specific durations between the field gaps and determines the value of the transmitted character from the determined duration.

For error-free data transmission or decoding of the characters, it is necessary that the signal courses generated by the base station and received by the transponder by inductive coupling have established maximum tolerances, for example, in regard to their time course and/or employed level.

To increase the achievable ranges between base station and passive transponders, the quality of a parallel resonant circuit, which is formed here by the antenna coil and a capacitor connected parallel thereto, is increased in order to enable the supplying of the passive transponder from the field transmitted by the base station at greater distances as well. The reduced damping of the resonant circuit has the effect that at a field gap the coil voltage or the voltage of the parallel resonant circuit of the transponder declines more slowly than in the case of a resonant circuit with a lower quality and therefore higher damping. Because the field gap in the transponder can be detected, however, only when the coil voltage or a voltage obtained from the coil voltage by rectification has declined below a settable potential, field gaps can be detected in a delayed manner in comparison with a resonant circuit with a lower quality. This has the result that the duration of the field gaps detected in the transponder are shortened and the durations between the field gaps, which represent the corresponding character value, are lengthened. This change in the timing of the signal courses detected in the transponder is influenced directly by the quality of the resonant circuit. In other words, the timing of the signals received in the transponder substantially depend on various parameters, for example, on the employed antenna coil, as a result of which an error-free data transmission cannot always be guaranteed in the case of changes in parameters.

In a conventional system, to be able to ensure interference-free data transmission also in the case of such parameter-dependent timing variations, after the initiation of the data transmission, a reference duration is transmitted by successive field gaps by the base station, with which a calibration value is determined in the transponder, whereby the calibration value is used for calibrating the subsequently received durations. The reference duration in this case corresponds to a known character value, for instance, "0." Because it is known in the transponder how long the duration belonging to the character value "0" must be theoretically, the calibration or offset value can be calculated from the actual, measured reference duration.

However, this method cannot be carried out with transponders not supporting this method or this transmission protocol, because these interpret the reference duration already as a character, as a result of which the character sequence received in the transponder is corrupted.

German Patent Publication DE 198 27 476 C1 discloses a method in which after an HF charge pulse two reference pulses are transmitted, of which the one with a longer duration represents an H-bit and the other with the shorter duration an L-bit.

German Patent Application DE 197 44 781 C1, which corresponds to U.S. Pat. No. 6,044,333, discloses a method for calibrating an RC oscillator of a transponder, in which a data set is expanded by a calibration signal to calculate a correction value.

OVERVIEW

Particular embodiments provide a method for wireless data transmission between a base station and a transponder by means of inductive coupling, which, in one respect, makes possible interference-free data transmission in the case of parameter-dependent timing variations and can be carried out simultaneously also with transponders which have no calibration mechanism to compensate for the timing variations.

Particular embodiments can be carried out with transponders that support a first data transmission protocol type and/or a second data transmission protocol type. Independent of the data transmission protocol type, the base station transmits a carrier signal with a frequency within a frequency range of 50 KHz to 250 KHz, a data transmission is initiated by the base station by generating a field gap of the carrier signal, characters which are transmitted by the base station to the transponder are encoded by associated durations between the temporally successive field gaps, a first character value is assigned a first duration, and at least one second character value is assigned a second duration. In the first data transmission protocol type, the data transmission is ended when a maximum value for a duration between successive field gaps is exceeded. In the second data transmission protocol type, after the initiation of the data transmission, a reference duration is transmitted by the base station, by means of which a calibration value is determined in the transponder, whereby the calibration value is used for calibrating the successively received durations. The reference duration is selected as greater than the maximum duration value and the data transmission is ended when a duration determined after the reference duration exceeds the maximum duration value. The data transmission according to both data transmission protocol types is initiated by the transmission of a first field gap. Transponders, which exclusively support the first data transmission protocol type, after the transmission of the first field gap by the base station thus enter a ready-to-receive state and wait for a further or second field gap at a time interval to the first field gap, which corresponds to an associated valid character value. The selection of the reference duration greater than the maximum duration value has the effect that the transponders that support exclusively the first data transmission protocol type, during the transmission of the reference duration, end the data transmission after the elapse of maximum duration value, i.e., set their ready-to-receive state and reset their receive logic. If the second field gap is now transmitted, which marks the end of the reference duration and the beginning of the transmission of the first character or useful datum to be transmitted, the transponder interprets this as a new initiation of the data transmission. Because the first and the second data transmission protocol type do not differ in the subsequent protocol course (i.e., the character values in particular associated with the different durations are identical), the transponder of the first data transmission protocol type also receives data that are transmitted according to the second data transmission protocol type, because the transmission of the reference duration leads only to the resetting of the ready-to-receive state in the transponder. In this way, data can be exchanged using both transponders of the second data transmission protocol type and transponders of the first data transmission protocol type; i.e., the data transmission protocol is downward compatible.

In particular embodiments, the first duration, the second duration, and/or the reference duration are determined in the transponder by counting the oscillations of the carrier signal. In this way, a cycle duration of the carrier signal can be used as a time base; i.e., a transponder-internal clock generator is not necessary.

In particular embodiments, monitoring occurs in the transponder whether a duration between the field gap for initiating the data transmission and a subsequent field gap lies within at least one settable time interval. If this duration lies within the time interval, a decoding of the received character is carried out based on the first data transmission protocol type. This is appropriate particularly for transponders that support both the first and also the second data transmission protocol type. If, for example, a base station, which supports only the first data transmission protocol type, wishes to carry out a data transmission with this type of transponder, for example, in order to write the transponder, it transmits directly the first useful datum or useful character of the data to be transmitted before transmitting a reference duration for calibration. The transponder now detects from the length or the duration between the first two field gaps whether this is a reference duration or already a useful datum to be transmitted, because the reference duration is much longer than the duration used for encoding a character value. If the transponder now detects that no reference duration is transmitted, i.e., that the base station is using the first data transmission protocol type, the transponder activates the first data transmission protocol type. In this case, the decoding of the received characters or data in the transponder is begun immediately, i.e., without prior calibration by evaluating the reference duration. This makes it possible to use transponders of the second data transmission protocol type with base stations that implement only the first data transmission protocol type. In this case, base stations of any data transmission protocol type can communicate with transponders of any data transmission protocol type.

The first character value can be "0" and the second character value "1." In this way, a bit value can be precisely encoded with an associated duration. Preferably, in binary notation, a third character value is "10" and a fourth character value "11." In this way, four different bit combinations can be encoded with a total of four distinguishable durations.

In particular embodiments, the calibration value can be stored in the form of a counter value and a counter, used for duration determination, is preloaded at the beginning of a duration measurement with the counter value. To determine the calibration value, for example, a counter with a predefined bit width can be used, which at the beginning of the data transmission is set to an initial value, for example, zero. During the reference duration, the counter is incremented in the cycle of the carrier signal oscillation, whereby a counter overflow can also occur. The count at the end of the reference duration, i.e., in the second field gap, for instance, provided with a negative sign, can then be used as a starting value of the counter in the duration determination in the course of character decoding. In this case, in the field gap that marks the beginning of a character encoding, the stored starting value is loaded into the counter and the counter is incremented until the subsequent field gap is detected.

The detailed description and specific examples of this disclosure are given by way of illustration only.

BRIEF DESCRIPTION OF THE DRAWINGS

The description given hereinbelow and the accompanying drawings are given by way of illustration only and do not necessarily limit this disclosure.

FIG. 1 illustrates an RFID system with a base station and a transponder.

FIG. 2 shows time response diagrams of signals during a data transmission from the base station to the transponder of FIG. 1, whereby the transponder supports both a first data transmission protocol type and a second data transmission protocol type and the base station transmits a reference duration.

DESCRIPTION OF EXAMPLE EMBODIMENTS

Figure 3:
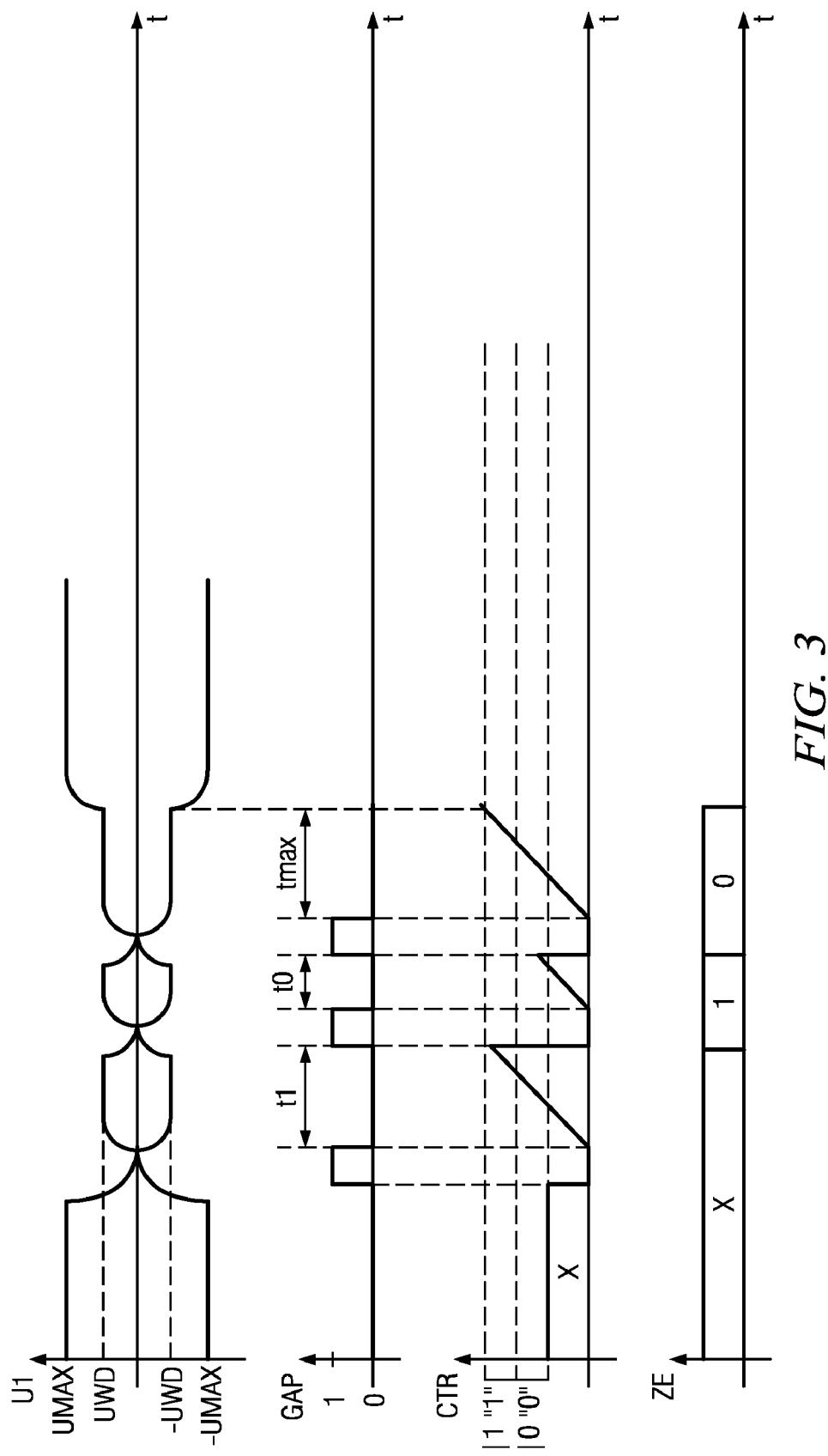
FIG. 3 shows time response diagrams of signals during a data transmission from the base station to the transponder of FIG. 1, whereby the transponder supports both the first data transmission protocol type and the second data transmission protocol type and the base station does not transmit a reference duration.

FIG. 1 shows an RFID system with a base station BS and a passive transponder TR. For data transmission by means of inductive coupling, the base station BS includes an antenna coil L1 and a capacitor C1. The transponder TR accordingly also has an antenna coil L2 and a capacitor C2. Antenna coils L1 and L2 form a transformer in a near field of the specific antenna coils L1 and L2.

For data transmission from the base station BS to the transponder TR, the base station BS generates a carrier signal with a frequency of 125 kHz, whose amplitude is totally suppressed for generating field gaps. The data transmission from transponder TR to base station BS occurs by means of load modulation.

FIG. 2 shows response diagrams of signals during a data transmission from the base station BS to the transponder TR of FIG. 1, whereby the transponder TR supports both a first data transmission protocol type and a second data transmission protocol type and at the start of the data transmission the base station BS transmits a reference duration "tref."

Before the data transmission, base station BS by means of its antenna coil L1 generates a magnetic alternating field with a frequency of 125 kHz, which due to the inductive coupling induces an alternating voltage U1 in antenna coil L2 of the transponder TR, whereby only the envelope curve of the alternating voltage U1 is shown in FIG. 2. An amplitude of the alternating voltage U1 is limited or clamped to a maximum voltage UMAX by clamp diodes (not shown) of the transponder TR.

To initiate the data transmission within the scope of a write access operation to the transponder TR, the base station BS generates a field gap or a gap by suppressing the carrier signal. Because of the high quality of the parallel resonant circuit, however, the voltage U1 falls only slowly along the envelope curve. The course of the voltage U1 is evaluated in the transponder TR. When the voltage U1 falls below an internal threshold value for the first time, an active signal GAP is generated transponder-internally. The signal GAP activated for the first time has the effect that the maximum voltage U1 is limited or clamped to a value UWD which is lower than the value UMAX. The voltage limitation to the value UWD occurs in the transponder TR typically in that a threshold voltage element is short-circuited by a parallel-connected switching element.

The voltage U1 is limited to the value UWD until an end of the data transmission is detected in the transponder TR. The end of the data transmission is detected in the transponder TR when a maximum duration value tmax between successive field gaps or gaps has been exceeded.

After the first field gap is generated, a transponder-internal counter CTR is initialized from a previously undefined counter value "X" to a counter value of "0." The counter or the counter value CTR is incremented after this beginning at the falling edge of the first gap signal in the cycle or in each new period of the carrier signal. The reference duration tref, i.e., the duration between the falling edge of the first gap signal and the rising edge of the successive second gap signal, is so large in the exemplary embodiment shown in FIG. 2 that the counter value CTR runs over once and starts again with the counter value "0." In the case of the rising edge of the second gap signal, the counter has a counter value "calib" which, having a negative sign, is used as the starting value of the counter during the subsequent duration measurements.

In the case of the falling edge of the second gap signal, the counter CTR is incremented in the cycle of the carrier signal beginning at a value "–calib." In the case of the rising edge of the third gap signal, the counter value CTR is read and the range of the read counter value is checked. The counter value CTR is within a value range or interval, which corresponds to a character value of "1," i.e., to a duration "t1," which is used by the base station for encoding a character with the value "1."

After counter value CTR is read, the counter CTR is again preloaded with the calibration value "–calib." In the case of the falling edge of the third gap signal, the counter CTR is incremented in the cycle of the carrier signal beginning at the value "–calib. In the case of the rising edge of the fourth gap signal, the counter value CTR is read and the range of the read counter value is checked. The counter value CTR is within a value range or interval, which corresponds to a character value of "0," i.e., to a duration "t0," which is used by the base station for encoding a character with the value "0."

The character values decoded in the transponder TR are shown in the lower diagram of FIG. 2. The character "X" in this case represents an undefined character value.

Because the base station BS in the shown exemplary embodiment transmits only the exemplary bit sequence "10" to the transponder TR, no additional field gaps are generated after the fourth field gap within the scope of the data transmission. In other words, in the case of the falling edge of the fourth gap signal, the counter CTR is incremented in the cycle of the carrier signal again beginning at the value "–calib." When the counter value CTR leaves the interval assigned to the character value "1," the transponder TR detects that the maximum duration value tmax between successive field gaps has been exceeded and ends the current data transmission, i.e., resets its receiving unit. This has the effect, inter alia, that the maximum value of the voltage U1 is again raised to UMAX, because the bridging of the threshold value element, causing the voltage limitation to UWD, is again separated.

The transponder TR can again receive data in a subsequent data transmission procedure. Owing to the calibration of the duration measurement by means of the reference duration, timing variations in the detected gap signals, for instance, due to different qualities of antenna coil L2 of different transponders, can be compensated.

FIG. 3 shows response diagrams of signals for a case in which the transponder supports both the first data transmission protocol type and the second data transmission protocol type and the base station does not transmit a reference duration "tref."

After the generation of the first field gap by the base station, as in the previously described example, the transponder-internal counter CTR is initialized from the previously undefined counter value "X" to the counter value "0." The counter or the counter value CTR is incremented after this beginning at the falling edge of the first gap signal in the cycle or in each new period of the carrier signal. In the rising edge of the second gap signal, the counter has a counter value which is within a range that corresponds to a character value of "1." The result is that the duration between the field gap for initiating the data transmission and the following field gap lies within a time interval used for encoding the character to be transmitted. In the example of FIG. 2, the respective counter value "calib" does not lie within an interval or time interval used for encoding. The transponder TR can therefore detect from the counter state whether a reference duration for calibration or directly a character to be transmitted is sent by the base station BS, i.e., which data transmission protocol type the base station supports.

If the transponder detects that the base station supports the first data transmission protocol type, the received data or characters are also decoded using the first data transmission protocol type. In this way, an automated protocol switching in the transponder TR is possible, when it supports both data transmission protocol types.

Figure 4:
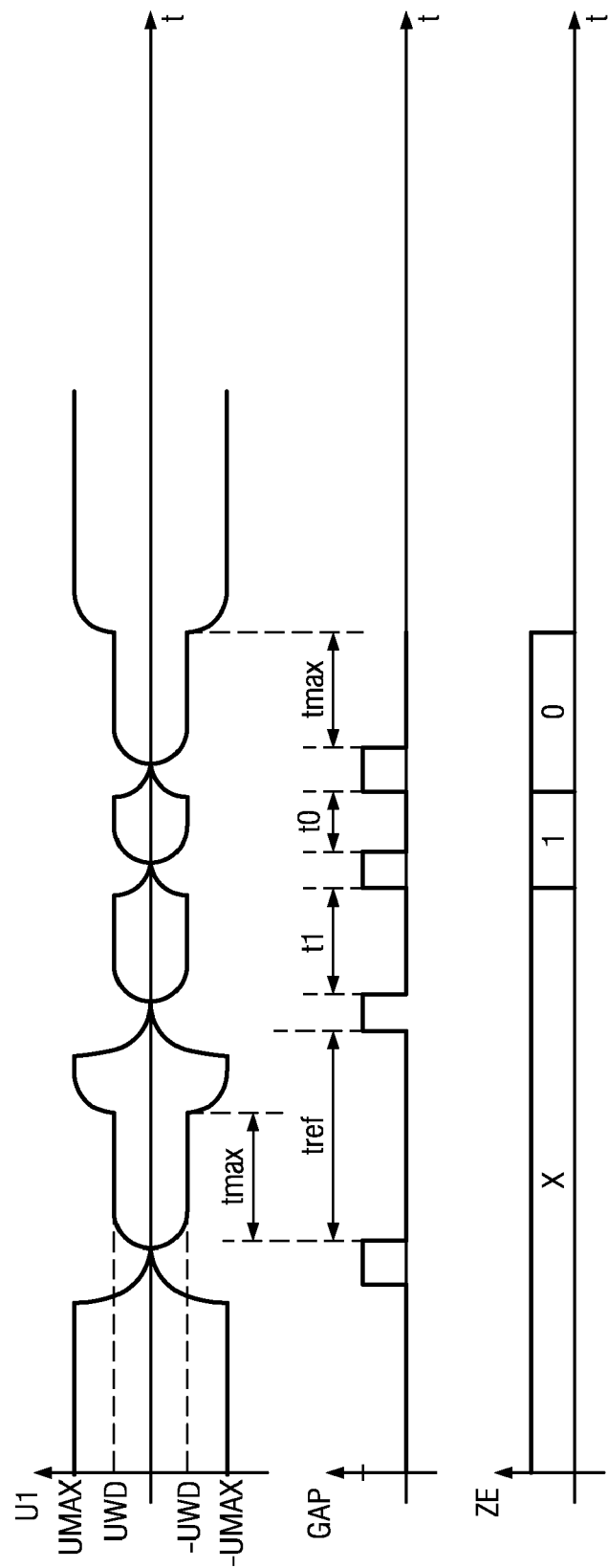
FIG. 4 shows time response diagrams of signals during a data transmission from the base station to the transponder of FIG. 1, whereby the transponder supports only the first data transmission protocol type and the base station transmits a reference duration.

FIG. 4 shows response diagrams of signals, when the transponder TR supports only the first data transmission protocol type and the base station transmits the reference duration, i.e., operates according to the second data transmission protocol type.

The data transmission is initiated as described above by the generation of the first field gap. The transponder TR then monitors the duration until the next field gap is detected. However, because the next field gap or the next rising edge of the gap signal is generated only after the duration "tref," whereby the duration "tref" is greater than the maximum duration value "tmax," the transponder TR resets its receiving unit after the duration tmax and ends the current data transmission. This becomes clear from the increase in the maximum value of the voltage U1 to the value UMAX. The transponder TR is then again in a ready-to-receive state and detects and properly decodes the subsequently transmitted characters, because the durations "t0" or "t1" assigned to the character values "0" and "1" are independent of the data transmission protocol type.

The shown embodiments make possible, in one respect, interference-free data transmission during parameter-dependent timing variations with use of the second data transmission protocol type, provided the transponders, which support both the first and the second data transmission protocol type, are located within the response range of a base station, which also supports the second data transmission protocol type. At the same time, the data transmission method can also be carried out with transponders which have no calibration mechanisms for compensating for timing variations. It is possible, furthermore, to operate transponders supporting both data transmission protocol types also with base stations that support only the first data transmission protocol type. Therefore, there is both a downward and upward compatibility.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving a carrier signal transmitted by a base station according to either a first data-transmission protocol or a second data-transmission protocol;
   detecting a first field gap in the carrier signal indicating initiation of a data transmission by the base station;
   determining whether a reference duration is present in the carrier signal after the first field gap, presence of the reference duration in the carrier signal after the first field gap indicating use of the first data-transmission protocol for the data transmission, absence of the reference duration from the carrier signal after the first field gap indicating use of the second data-transmission protocol for the data transmission;
   if the reference duration is present in the carrier signal after the first field gap then, according to the first data-transmission protocol:
      determining a calibration value for the data transmission based on the reference duration; and
      decoding the data transmission by measuring durations between successive subsequent field gaps and determining whether each duration as measured is a binary 1 or binary 0 based on the calibration value;
   if the reference duration is absent from the carrier signal after the first field gap then, according to the second data-transmission protocol, decoding the data transmission by measuring durations between successive subsequent field gaps and determining whether each duration as measured is a binary 1 or binary 0 based on a pre-stored value; and
   detecting a termination of the data transmission when a duration between successive subsequent field gaps exceeds a pre-stored maximum duration value.

2. The method of claim 1, wherein a first character value of the data transmission is assigned a first duration and a second character value is assigned a second duration.

3. The method of claim 1, further comprising measuring the reference duration and by counting oscillations of the carrier signal.

4. The method of claim 1, further comprising initializing a counter after detecting the first field gap.

5. The method of claim 1, further comprising:
   storing the calibration value as a counter value; and
   at a beginning of a duration measurement, preloading with the counter value a counter for determining durations between successive subsequent field gaps.

6. The method of claim 5, wherein determining whether the reference duration is present comprises determining whether the counter value lies within a time interval for encoding the data transmission.

7. The method of claim 5, further comprising setting a starting value of the counter to the calibration value.

8. The method of claim 1, wherein the carrier signal is transmitted within a frequency range of approximately 50 KHz to approximately 250 KHz.

9. An apparatus comprising:
an antenna coil;
a capacitor; and
circuitry coupled to the antenna coil and the capacitor, the circuitry configured to:
receive a carrier signal transmitted by a base station according to either a first data-transmission protocol or a second data-transmission protocol;
detect a first field gap in the carrier signal indicating initiation of a data transmission by the base station;
determine whether a reference duration is present in the carrier signal after the first field gap, presence of the reference duration in the carrier signal after the first field gap indicating use of the first data-transmission protocol for the data transmission, absence of the reference duration from the carrier signal after the first field gap indicating use of the second data-transmission protocol for the data transmission;
if the reference duration is present in the carrier signal after the first field gap then, according to the first data-transmission protocol:
determine a calibration value for the data transmission based on the reference duration; and
decode the data transmission by measuring durations between successive subsequent field gaps and determining whether each duration as measured is a binary 1 or binary 0 based on the calibration value;
if the reference duration is absent from the carrier signal after the first field gap then, according to the second data-transmission protocol, decode the data transmission by measuring durations between successive subsequent field gaps and determining whether each duration as measured is a binary 1 or binary 0 based on a pre-stored value; and
detect a termination of the data transmission when a duration between successive subsequent field gaps exceeds a pre-stored maximum duration value.

10. The apparatus of claim 9, wherein a first character value of the data transmission is assigned a first duration and a second character value is assigned a second duration.

11. The apparatus of claim 9, wherein the circuitry is further configured to measure the reference duration by counting oscillations of the carrier signal.

12. The apparatus of claim 9, wherein the circuitry is further configured to initialize a counter after detecting the first field gap.

13. The apparatus of claim 9, wherein the circuitry is further configured to:
store the calibration value as a counter value; and
at a beginning of a duration measurement, preload with the counter value a counter for determining durations between successive subsequent field gaps.

14. The apparatus of claim 13, wherein the circuitry is further configured to determine whether the counter value lies within a time interval for encoding the data transmission.

15. The apparatus of claim 13, wherein the circuitry is further configured to set a starting value of the counter to the calibration value.

16. The apparatus of claim 9, wherein the carrier signal is transmitted within a frequency range of approximately 50 KHz to approximately 250 KHz.

17. An apparatus comprising:
means for receiving a carrier signal transmitted by a base station according to either a first data-transmission protocol or a second data-transmission protocol;
means for detecting a first field gap in the carrier signal indicating initiation of a data transmission by the base station;
means for determining whether a reference duration is present in the carrier signal after the first field gap, presence of the reference duration in the carrier signal after the first field gap indicating use of the first data-transmission protocol for the data transmission, absence of the reference duration from the carrier signal after the first field gap indicating use of the second data-transmission protocol for the data transmission;
means for, if the reference duration is present in the carrier signal after the first field gap then, according to the first data-transmission protocol:
determining a calibration value for the data transmission based on the reference duration; and
decoding the data transmission by measuring durations between successive subsequent field gaps and determining whether each duration as measured is a binary 1 or binary 0 based on the calibration value;
means for, if the reference duration is absent from the carrier signal after the first field gap then, according to the second data-transmission protocol, decoding the data transmission by measuring durations between successive subsequent field gaps and determining whether each duration as measured is a binary 1 or binary 0 based on a pre-stored value; and
means for detecting a termination of the data transmission when a duration between successive subsequent field gaps exceeds a pre-stored maximum duration value.

* * * * *